(Model.)

4 Sheets—Sheet 1.

J. B. G. A. CANET.
APPARATUS FOR POINTING OR LAYING GUNS.

No. 419,581.

Patented Jan. 14, 1890.

Witnesses,
Geo. W. Rea
Robt Everett

Inventor
Jean B. G. A. Canet
By
James L. Norris
Atty.

(Model.)

J. B. G. A. CANET.
APPARATUS FOR POINTING OR LAYING GUNS.

No. 419,581.

4 Sheets—Sheet 3.

Patented Jan. 14, 1890.

Witnesses.
Geo. W. Rea.
Robt Enrett

Inventor
Jean B. G. A. Canet.
By James L. Norris.
Atty.

(Model.)

J. B. G. A. CANET.
APPARATUS FOR POINTING OR LAYING GUNS.

No. 419,581. Patented Jan. 14, 1890.

Witnesses:
Geo. H. Rea.
Robert Pruitt.

Inventor,
Jean B. G. A. Canet.
By
James L. Norris.
Atty.

UNITED STATES PATENT OFFICE.

JEAN BAPTISTE GUSTAVE ADOLPH CANET, OF PARIS, FRANCE, ASSIGNOR OF ONE-HALF TO SIR JOSEPH WHITWORTH & CO., (LIMITED,) OF MANCHESTER, ENGLAND.

APPARATUS FOR POINTING OR LAYING GUNS.

SPECIFICATION forming part of Letters Patent No. 419,581, dated January 14, 1890.

Application filed August 21, 1888. Serial No. 283,390. (Model.) Patented in France September 9, 1886, No. 178,422, and January 29, 1887, No. 184,518, and in England July 1, 1887, No. 9,373.

*To all whom it may concern:*

Be it known that I, JEAN BAPTISTE GUSTAVE ADOLPHE CANET, engineer, a citizen of the Republic of France, and a resident of Paris, France, have invented new and useful Improvements in and relating to Apparatus for Pointing or Laying Guns, (for which I have obtained patents in the following countries: Great Britain, No. 9,373, dated July 1, 1887, and France, No. 178,422, dated September 9, 1886, and No. 184,518, dated January 29, 1887,) of which the following is a specification, reference being had to the accompanying drawings.

This invention relates to apparatus for pointing or laying guns, and comprises the improvements hereinafter described.

The said invention is illustrated in the accompanying drawings, in which—

Figure 1:
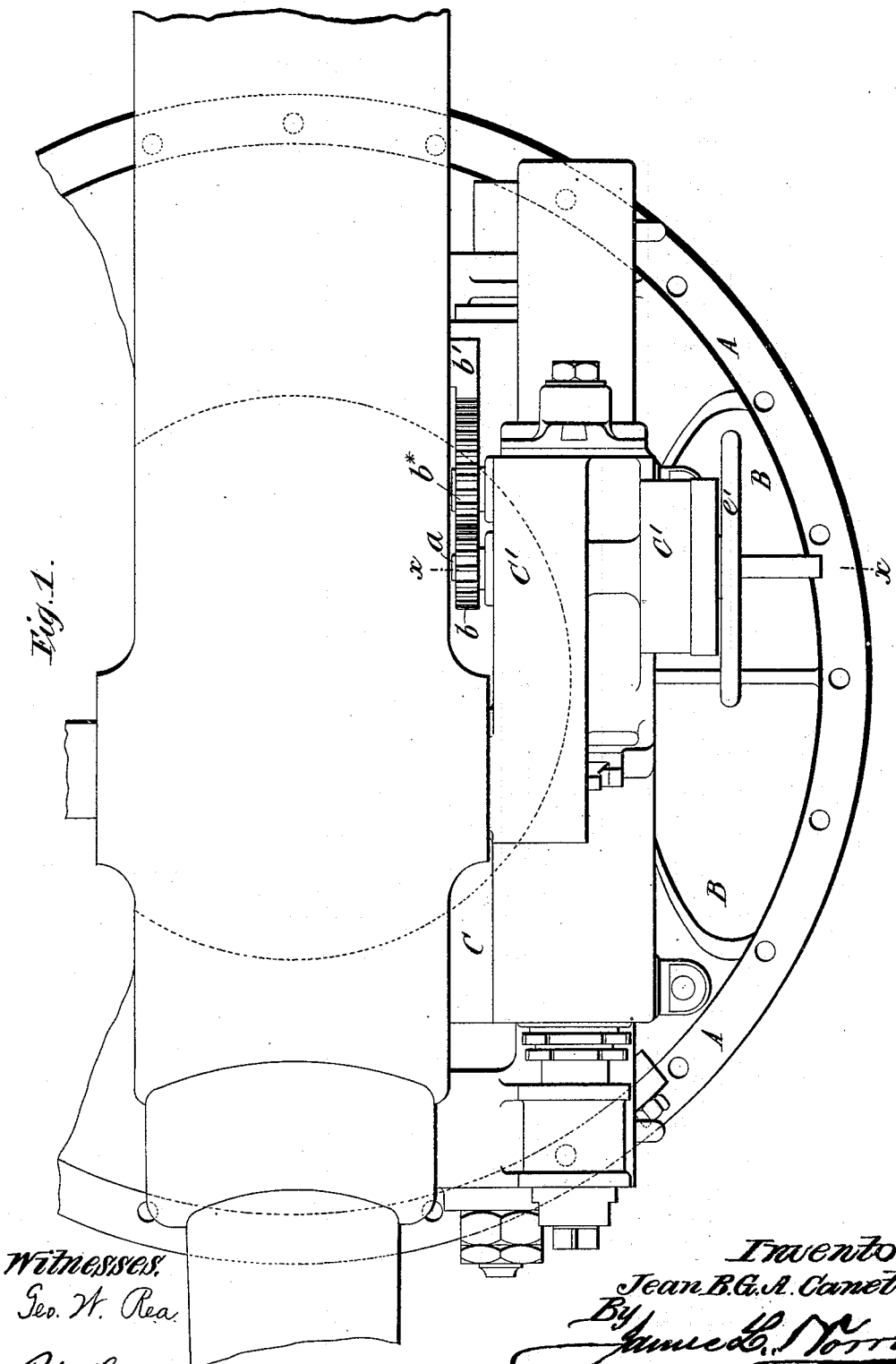
Figure 2:
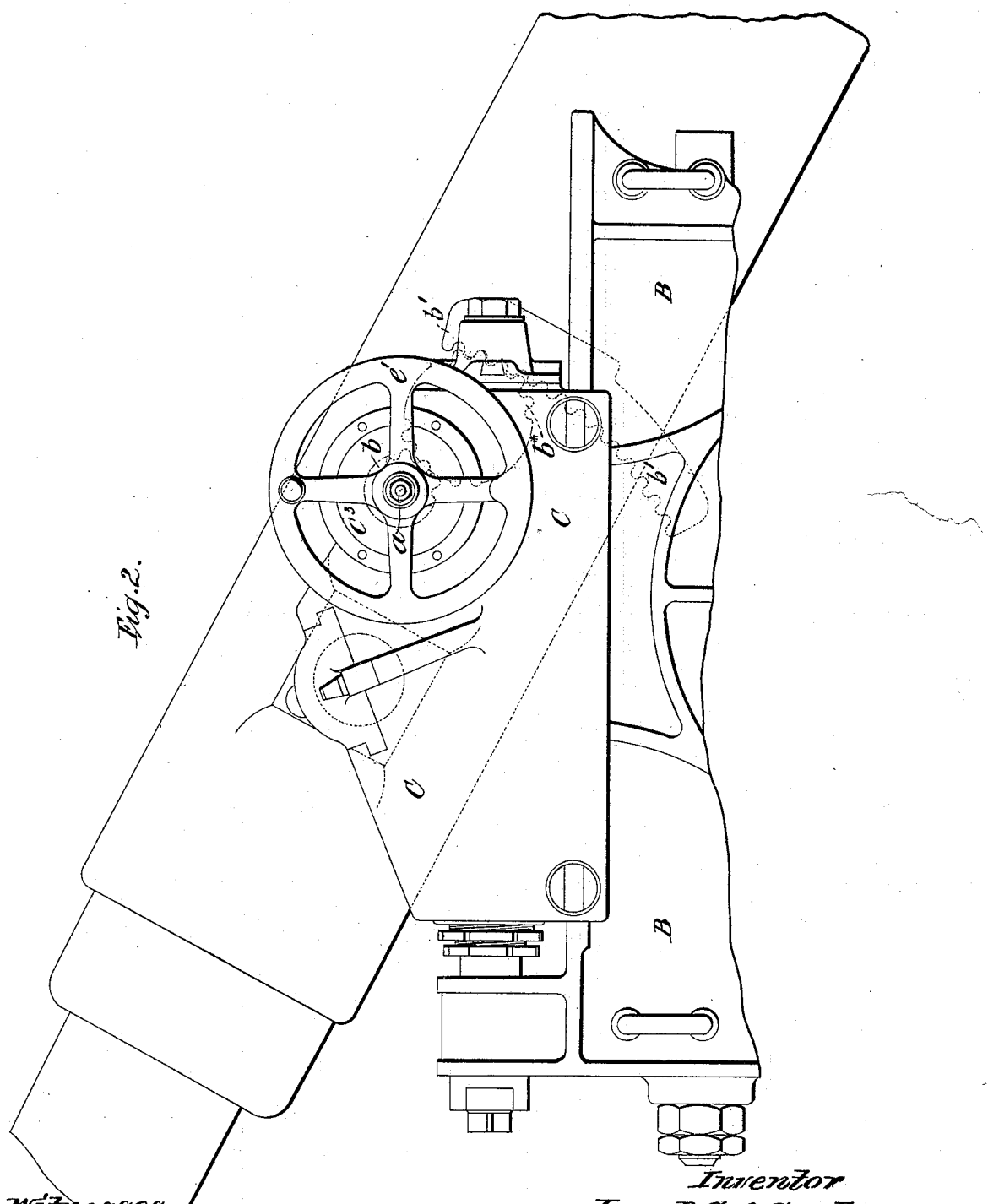
Figure 3:
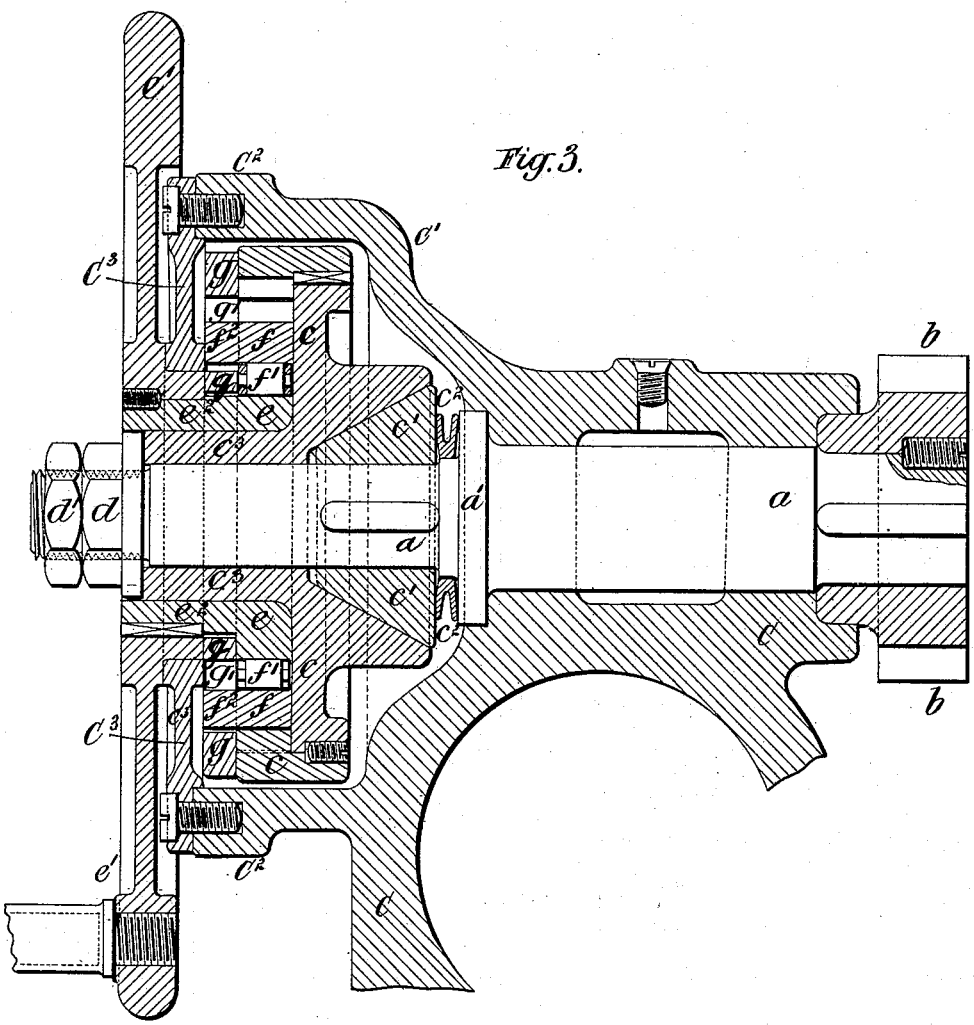
Figure 4:
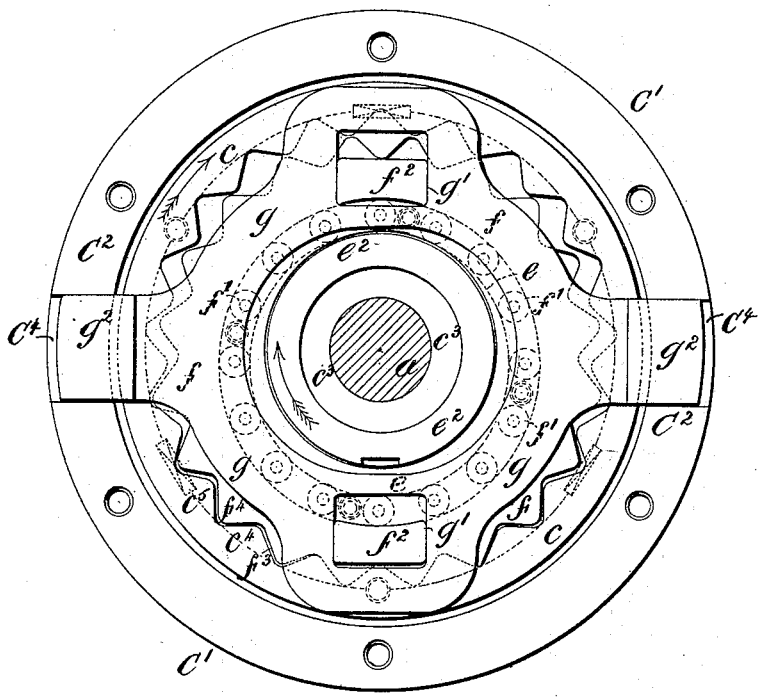

Figure 1 is a plan, and Fig. 2 a side elevation, of part of a gun-mounting with one form of my improved elevating apparatus applied thereto. Fig. 3 is a transverse section on the line $x$ $x$, Fig. 1, drawn to an enlarged scale. Fig. 4 is a side elevation, partly in vertical section, also drawn to an enlarged scale, showing the elevating mechanism, some of the parts being removed.

Like letters indicate corresponding parts throughout the drawings.

A is the base-plate or racer; B, the platform, turn-table, or under carriage carrying the chassis or slide; C, the cradle or top carriage in which the gun is supported by its trunnions and which recoils with the gun upon the said chassis or slide against the resistance of suitable hydraulic brakes.

$a$ is a shaft which is fitted to rotate in suitable bearings in the cradle or top carriage C. $b$ is a pinion, which is mounted upon the said shaft, and is geared either directly or through the medium of one or more toothed wheels $b^*$ with a segmental rack or elevating arc $b'$, attached to the gun, so that by turning the said shaft the gun is moved upon or about its trunnions for elevation or depression.

For imparting motion to the shaft $a$ and pinion $b$, I provide the following arrangement of gearing—that is to say, an internally-toothed wheel or ring $c$, working within a casing $C'$, formed with or firmly attached to one of the brake-cylinders, is fitted upon the shaft $a$, so that the said shaft can turn therein. This wheel or ring is made with a conical recess or cavity, and is arranged in combination with a cone $c'$, keyed upon the said shaft $a$, so that it must rotate therewith, but can slide longitudinally thereon through a short distance. This cone is held in frictional contact with the toothed wheel $c$ by means of a spring $c^2$, bearing against a collar $a'$, formed or fixed on the shaft $a$. This spring is preferably a ring or annular piece which is U-shaped or V-shaped in transverse section. A so-called "Belleville" or other suitable spring may, however, be employed.

For insuring the rotation of the shaft $a$ with the toothed wheel $c$, the screw-nuts $d$ $d'$ are provided at the outer end of the said shaft to press the said wheel against the cone $c'$. Sufficient friction or adherence between the cones is thus obtained to enable the shaft to be rotated through the medium of the toothed wheel $c$, while permitting movement of the said shaft independently of the said wheel when necessary.

Upon the boss or hub $c^3$ of the toothed wheel $c$ is placed an eccentric $e$, which can be rotated by means of a balanced hand-wheel $e'$, or equivalent device, keyed upon the boss or hub $e^2$ of the said eccentric. Around this eccentric is arranged a pinion $f$, and to facilitate the movement of the eccentric within the said pinion a circle of rollers $f'$, connected by rings, or a circle of balls, is interposed between them.

The pinion $f$ is provided with two projections or lugs $f^2$, fitted to slide in vertical slots or apertures $g'$ in a guide plate or disk $g$. This guide-plate is provided with projections or lugs $g^2$, which are fitted to slide in guide-apertures in the rim $C^2$ of the casing $C'$. This casing is provided with a cover C for inclosing and protecting the mechanism. It will be seen that the guide-plate $g$ can only be moved horizontally, while the pinion $f$, though it must move horizontally with the said guide-plate and is free to move vertically relatively thereto, is prevented from rotating upon or about its axis. Therefore when the eccentric $e$ is rotated it will impart a gyratory motion to the said pinion $f$—that is to say, it will without rotating the said pinion about its axis cause the same to move around the axis of the shaft $a$.

When the hand-wheel $e'$ is manipulated to rotate the eccentric $e$, the said eccentric communicates motion to the pinion $f$, so that all of the teeth of the said pinion successively engage with all of the teeth of the internally-toothed wheel or ring $c$—that is to say, as the pinion $f$ is moved by the eccentric one after another of its teeth acts upon the tooth of the wheel $c$ in front of it.

To enable the operation of the parts to be more clearly understood, let it be assumed that the parts occupy the positions shown in Fig. 4 and that the eccentric $e$ is being rotated in the direction indicated by the arrows in this figure. It is evident that in the gyratory movement of the pinion $f$ the tooth $f^3$ thereof will act upon the tooth $c^4$ of the wheel $c$ and thus move the said wheel through a small angle in the direction indicated by the arrows. The tooth $f^4$ will then act in a similar manner upon the tooth $c^5$, and so on. The number of teeth of the pinion $f$ being less than that of the wheel $c$, the said wheel, and consequently the shaft $a$, will be rotated in such a manner that in every revolution of the hand-wheel $e'$ the said shaft will turn through a small angle, which will vary according to the difference between the number of teeth of the said pinion $f$ and the number of teeth of the wheel $c$. This arrangement of gearing works more rapidly and with less friction than worm-gearing; moreover, movement of the gun upon or about its trunnions cannot affect the elevating mechanism. If exceptionally severe stresses should occur when the gun is fired, the cone $c'$ will slip within the internally-toothed wheel $c$ and the latter will not rotate with the shaft $a$.

The mechanism above described can, if desired, be arranged (either with or without the friction-cones) in combination with suitable gearing for training or traversing a gun.

Having now particularly described and ascertained the nature of my said invention and in what manner the same is to be performed, I wish it understood that I do not claim, generally or irrespectively of my improvements herein set forth, the gyrating pinion, except in so far as it forms a part or element of my improved apparatus; but

I claim—

1. The combination, with a gun and a shaft connected by gearing with a device for aiming or pointing the said gun, of an internally-toothed wheel or ring rotatively connected with the said shaft, an eccentric fitted to rotate upon the said shaft, and a toothed pinion mounted upon said eccentric, but prevented from rotation therewith, and geared with the said internally-toothed wheel or ring, for the purposes above specified.

2. The combination, with a gun and a shaft connected by gearing with a device for aiming or pointing the said gun, of an internally-toothed wheel or ring rotatively connected with the said shaft, an eccentric fitted to rotate upon the said shaft, a toothed pinion mounted upon the said eccentric and geared with the said internally-toothed wheel or ring, and a guide-plate arranged to move transversely to the axis of the said shaft, the said toothed pinion being provided with projections fitting into slots formed in the said guide-plate at right angles to the direction of its movement, substantially as and for the purposes set forth.

3. The combination, with a gun and a shaft connected by gearing with a device for aiming or pointing the said gun, of an internally-toothed wheel or ring mounted upon the said shaft, a friction-cone fixed upon the said shaft, a spring whereby the said cone is held in frictional contact with the said internally-toothed wheel or ring, an eccentric fitted to rotate upon the said shaft, and a toothed pinion mounted upon the said eccentric, but prevented from rotation therewith and geared with the said internally-toothed wheel or ring, substantially as and for the purposes set forth.

4. The combination, with a gun, and a shaft connected by gearing with a device for aiming or pointing the said gun, of an internally-toothed wheel $c$, rotatively connected with the said shaft, an eccentric $e$, fitted to rotate upon the hub or boss of the said wheel, a hand-wheel $e'$ for rotating the said eccentric, a toothed pinion $f$, having projections $f^2$ mounted upon the said eccentric and geared with the said internally-toothed wheel, a casing $C'$, inclosing the said toothed wheel, eccentric, and pinion and provided with slots or guide-apertures $C^4$, and a guide-plate $g$, provided with slots $g'$, in which slide the projections $f^2$ on the said pinion $f$, and with projections $g^2$, arranged to slide in the said slots or guide-apertures $C^4$, substantially as and for the purposes set forth.

5. The combination, with a gun and a shaft connected by gearing with a device for aiming or pointing the said gun, of an internally-toothed wheel $c$, rotatively connected with the said shaft, an eccentric $e$, fitted to rotate upon the hub or boss of the said wheel, a hand-wheel $e'$ for rotating the said eccentric, a toothed pinion $f$, having projections $f^2$ mounted upon the said eccentric and geared with the said internally-toothed wheel, rollers $f'$ being arranged between the said pinion and eccentric, a casing $C'$, inclosing the said toothed wheel, eccentric, and pinion and provided with slots or guide-apertures $C^4$, and a guide-plate $g$, provided with slots $g'$, in which slide the projections $f^2$ on the said pinion $f$, and with projections $g^2$, arranged to slide in the said slots or guide-apertures $C^4$, substantially as and for the purposes set forth.

6. The combination, with a gun provided with a segmental rack or elevating-arc, of a shaft carried in bearings in the gun carriage or mounting and connected by gearing with the said segmental rack or elevating-arc, an internally-toothed wheel rotatively connected with the said shaft, an eccentric arranged to rotate upon the said shaft, and a toothed pinion mounted upon the said eccentric, but prevented from rotation therewith and geared with the said internally-toothed wheel, substantially as and for the purpose set forth.

7. The combination, with a gun and a segmental rack or elevating-arc secured thereto, of a shaft $a$, carried in bearings in the gun-mounting, a pinion $b$, fixed on the said shaft and geared through the toothed wheel $b^*$ with the said elevating-arc, an internally-toothed wheel $c$, rotatively connected with the said shaft, an eccentric $e$, arranged to rotate upon the said shaft, a pinion $f$, having projections $f^2$ mounted upon the said eccentric and geared with the said internally-toothed wheel, a casing $C'$, inclosing the said toothed wheel, eccentric, and pinion and provided with slots or guide-apertures $C^4$, and a guide-plate $g$, provided with slots $g'$ in which slide the projections $f^2$ on the pinion $f$, and with projections $g^2$, arranged to slide in the said slots or guide-apertures $C^4$, substantially as and for the purpose set forth.

In testimony whereof I have hereunto signed my name in the presence of two subscribing witnesses.

JEAN BAPTISTE GUSTAVE ADOLPHE CANET.

Witnesses:
    ROBT. M. HOOPER,
    CH. F. THIRION.